US005923506A

United States Patent [19]
Herrera

[11] Patent Number: 5,923,506
[45] Date of Patent: Jul. 13, 1999

[54] RECORDING HEAD ELEMENT WITH IMPROVED COIL TAP AND METHOD FOR MANUFACTURING SAME

[75] Inventor: Steven C. Herrera, Littleton, Colo.

[73] Assignee: Storage Technology Corporation, Louisville, Colo.

[21] Appl. No.: 08/943,361

[22] Filed: Oct. 3, 1997

[51] Int. Cl.⁶ .................................................. G11B 5/147
[52] U.S. Cl. .......................................................... 360/126
[58] Field of Search .......................... 360/113, 119–122, 360/126

[56] References Cited

U.S. PATENT DOCUMENTS

| | | | |
|---|---|---|---|
| 4,589,042 | 5/1986 | Anderson | 360/125 |
| 5,034,838 | 7/1991 | Brock et al. | 360/122 |
| 5,142,768 | 9/1992 | Aboaf et al. | 360/126 |
| 5,203,119 | 4/1993 | Cole | 51/165.77 |
| 5,264,981 | 11/1993 | Campbell et al. | 360/126 |
| 5,296,993 | 3/1994 | Aboaf et al. | 360/126 |
| 5,302,461 | 4/1994 | Anthony | 360/122 |
| 5,331,493 | 7/1994 | Schwarz | 360/113 |
| 5,486,968 | 1/1996 | Lee et al. | 360/126 |
| 5,751,522 | 5/1998 | Yamada et al. | 360/126 |

OTHER PUBLICATIONS

Richard Dee and James Cates, Designing write heads for high–density tape, Data Storage, pp. 43–48, Oct. 1996.

Brahmin Lekmine, Recording Channel and Data Detection in Magnetic Tape Drives, Proceedings, SPIE–The International Society for Optical Engineering, High Density Data Recording and Retrieval Technologies, Oct. 23–24, 1995, vol. 2604, pp. 176–191.

Richard C. Schneider, Design Methodology for High Density Read Equalization, Proceedings, SPIE–The International Society for Optical Engineering, High Density Data Recording and Retrieval Technologies, Oct. 23–24, 1995, vol. 2604, pp. 200–209.

Priyadarshee et al., Survey of digital transport servo systems, Proceedings, SPIE–The International Society for Optical Engineering, High Density Data Recording and Retrieval Technologies, Oct. 23–24, 1995, vol. 2604 pp. 210–217.

Eric Baugh et al., Head/tape interface, Proceedings, SPIE–The International Society for Optical Engineering, High Density Data Recording and Retrieval Technologies, Oct. 23–24, 1995, vol. 2604, pp. 158–164.

James A. Bain, Recording heads: write heads for high–density magnetic tape, SPIE–The International Society for Optical Engineering, High Density Data Recording and Retrieval Technologies, Oct. 23–24, 1995, vol. 2604, pp. 165–175.

Jim Eaton, Magnetic tape trends and futures, Proceedings, SPIE–The International Society for Optical Engineering, High–Density Data Recording and Retrieval Technologies, Oct. 23–24, 1995, vol. 2604, pp. 146–157.

F. William Hahn, Jr., Historical Perspective of Tape Head Contours, IBM Corporation, 1987, pp. 21–27, Tucson, Arizona.

*Primary Examiner*—Brian E. Miller
*Attorney, Agent, or Firm*—Brooks & Kushman P.C.

[57] ABSTRACT

A recording element for use in a high density thin film recording head, and a method for manufacturing such an element are provided. The recording element includes a substrate, an insulative layer in contact with the substrate, and a first magnetic pole in contact with the insulative layer. The recording element also includes a coil tap in contact with the insulative layer, where the first magnetic pole and the coil center tap fabricated from the same material layer deposited on the insulative layer, and a coil having a lead deposited on the coil tap such that the coil tap is capable of conducting an electric current to the coil. The method for manufacturing the recording element includes depositing an insulative layer on a substrate and depositing a layer of magnetic and electrically conductive material on the insulative layer. The method also includes forming a first magnetic pole from the magnetic and electrically conductive layer, forming a coil tap from the magnetic and electrically conducting layer, and depositing a coil having a lead on the coil tap such that the coil tap is capable of conducting an electric current to the coil.

12 Claims, 1 Drawing Sheet

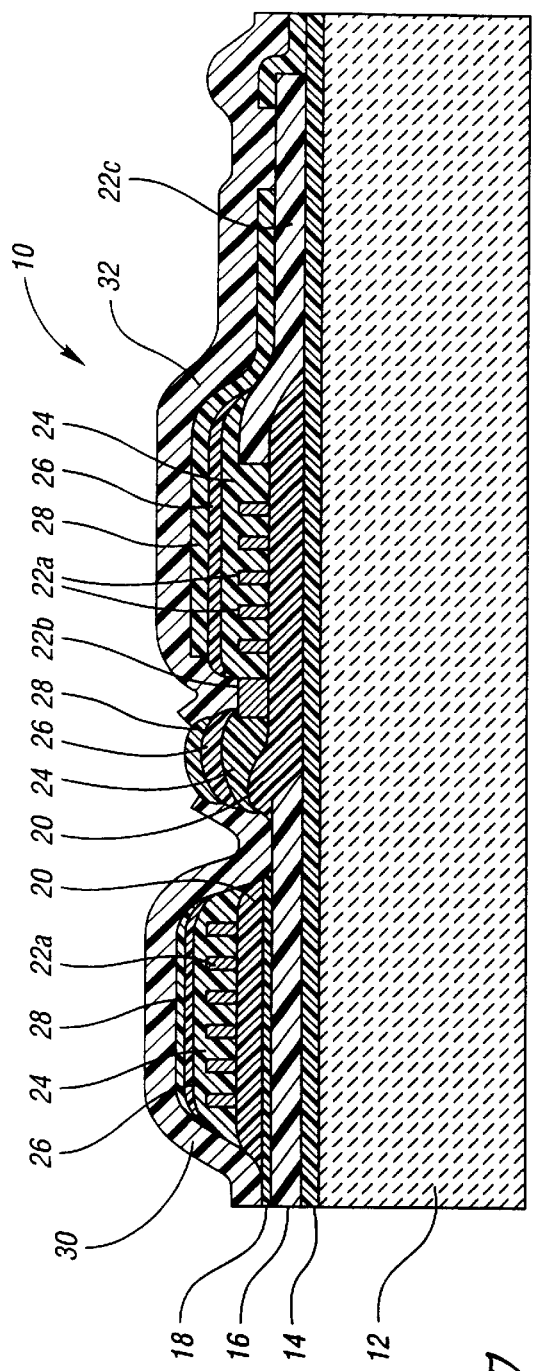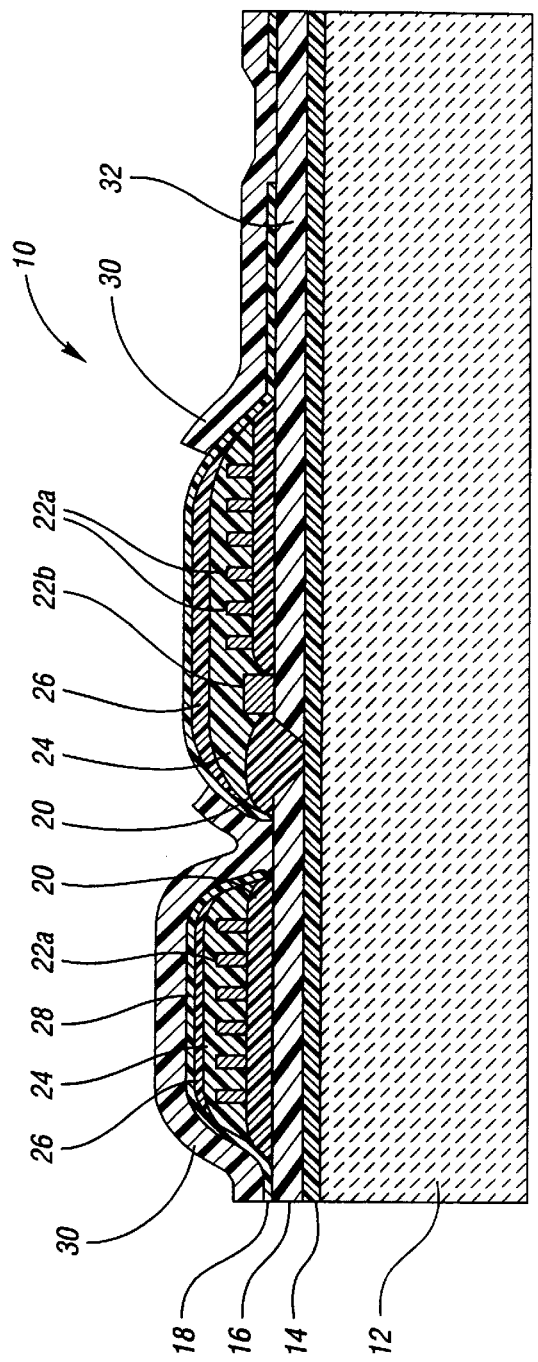

5,923,506

RECORDING HEAD ELEMENT WITH IMPROVED COIL TAP AND METHOD FOR MANUFACTURING SAME

TECHNICAL FIELD

The present invention relates to a recording element and a method for manufacturing a recording element having an inductive coil tap fabricated from the same material layer as a magnetic pole, prior to fabrication of the inductive coil.

BACKGROUND ART

An important and continuing goal in the data storage industry is that of increasing the density of data stored on a medium. For tape storage systems, that goal has lead to decreasing the track pitch and the track width in magnetic tapes, increasing the track density in recording tape heads, and the development of metal particle (MP) tape to replace conventional chrome tape.

MP tape, however, has a higher magnetic coercivity (on the order of three times greater) than conventional chrome tape. As a result, higher magnetic flux levels must be generated in recording heads in order to write data to MP tape. Conventional write heads in tape storage systems have magnetic poles constructed from ferrite based materials or the like. Such materials, however, have relatively low saturation magnetization levels, and therefore will not support the magnetic field required to write data to MP tape.

To solve this problem, some recording head manufacturers have used metal-in-gap (MIG) magnetic pole designs, as well as thin film heads having nickel-iron magnetic pole materials such as permalloy or the like. However, because of their lower resistivity, such materials are not well suited to higher frequency applications.

As a result, alternative magnetic pole materials, such as cobalt-zirconium-tantalum (CoZrTa) alloys, cobalt-zirconium-niobium (CZN) alloys, iron-nitride (FeN), or iron-nitride alloys, have been developed for use in high density tape storage systems. Such materials provide the high saturation magnetization levels (on the order of four times greater than conventional pole materials), high resistivity, low coercivity, and other magnetic properties required to write data to MP tape, and are suited for high frequency applications. The high saturation magnetization levels of such materials also permit the poles of the write head to be thinner, on the order of four microns.

However, the use of such new magnetic pole materials in high density tape storage systems has created problems in the conventional thin film manufacturing methods for recording heads, such as photolithography. More specifically, conventional processes creates a topography on which it is difficult to accurately deposit and process CoZrTa to create a coil center tap. Moreover, CoZrTa demonstrates different process characteristics depending upon the material of the underlying layer.

While these problems may be partially addressed by the use of ion milling processes or combined ion milling and photolithographic processes to fabricate a thin film write head, ion milling is an expensive process which increases the cost of the resulting recording element. Thus, there exists a need for a method for photolithographic fabrication of a thin film write head that overcomes the problems associated with the use of magnetic pole materials such as CoZrTa or the like.

SUMMARY OF THE INVENTION

Accordingly, a principle object of the present invention is to provide an improved recording element for use in a high density recording head, the recording element having an inductive coil tap fabricated from the same material layer as a magnetic pole, prior to fabrication of the inductive coil.

Another object of the present invention is to provide a photolithographic method for manufacturing such an improved recording element.

According to the present invention, then, a recording element is provided for use in a high density thin film recording head. The recording element comprises a substrate, an insulative layer in contact with the substrate, and a first magnetic pole in contact with the insulative layer. The recording element further comprises a coil tap in contact with the insulative layer, the first magnetic pole and the coil center tap fabricated from the same material layer deposited on the insulative layer, and a coil having a lead deposited on the coil tap such that the coil tap is capable of conducting an electric current to the coil.

A method for manufacturing a recording element for use in a high density thin film recording head is also provided according to the present invention. The method comprises depositing an insulative layer on a substrate, and depositing a layer of magnetic and electrically conductive material on the insulative layer. The method further comprises forming a first magnetic pole from the magnetic and electrically conductive layer, forming a coil tap from the magnetic and electrically conducting layer, and depositing a coil having a lead on the coil tap such that the coil tap is capable of conducting an electric current to the coil.

These and other objects, features and advantages will be readily apparent upon consideration of the following detailed description in conjunction with the accompanying drawings.

BRIEF DESCRIPTION OF THE DRAWINGS

FIG. 1 is a cross-sectional view of an exemplary prior art thin film write head manufactured according to an exemplary prior art photolithographic process; and FIG. 2 is cross-sectional view of one embodiment of the thin film write head of the present invention manufactured according to one embodiment of the method of the present invention.

DETAILED DESCRIPTION OF THE INVENTION

Referring now to FIGS. 1 and 2, the preferred embodiment of the present invention will now be described in detail. In that regard, FIG. 1 shows a cross-sectional view of an exemplary prior art thin film write head (10) manufactured according to an exemplary prior art photolithographic process. As seen therein, write head (10) comprises a substrate (12) such as aluminum oxide-titanium carbide ($Al_2O_3TiC$), ferrite, aluminum oxide ($Al_2O_3$), or silicone carbide having an insulative layer (14) such as aluminum oxide deposited thereon.

Write head (10) further includes a magnetic "bottom" pole (16) deposited on insulative layer (14). Magnetic pole (16) may be fabricated from any number of materials, such as the ferrite materials, nickel-iron alloys including permalloy previously described, or various cobalt alloys. A magnetic gap (18), preferably aluminum oxide, is then deposited on magnetic pole (16). It should be noted that magnetic pole (16) and magnetic gap (18) are fabricated according to photolithographic processes well known in the art.

A planarizing layer (20) is then deposited over magnetic gap (18), magnetic pole (16) and insulative layer (14).

Planar (20) is a photoresist material which is processed and baked to create a hard, electrically insulating, smooth surface at the locations shown. A conductive material such as copper is then electroplated on planar (20) to create inductive coils (22a, 22b, 22c) of write head (10). Coils (22a, 22b, 22c) include leads (22b, 22c) through which electric current is supplied to coils (22a). In that regard, by virtue of its location, coil lead (22b) is referred to as a "center tap." Once again, planar (20) and coils (22a, 22b, 22c) are fabricated according to known photolithographic processes.

To smooth the topography over coils (22a, 22b, 22c), additional planars (24, 26, 28) are next deposited thereover. Planars (24, 26) are again a photoresist material which are processed to create openings, or vias, to magnetic pole (16) and coil lead (22b). Thereafter, a magnetic material similar to that used to fabricate magnetic pole (16) is deposited on planar (28) and processed to create magnetic "top" pole (30) and coil center tap (32). In that regard, the magnetic material fills the vias to magnetic pole (16) and coil lead (22b) such that magnetic poles (16, 30) create a magnetic yoke and current may be provided to coils (22a) during operation of write head (10).

Once again, planars (24, 26, 28), magnetic pole (30) and center tap (32) are fabricated using well known photolithographic processes. As those of ordinary skill will appreciate, to complete write head (10), additional closure material (not shown) is deposited over magnetic pole (30), planar (28) and coil center tap (32), and known mechanical trimming and lapping techniques are used to prepare the tape interface at that end of write head (10) where magnetic poles (16, 30) are separated by magnetic gap (18).

As previously described, however, the use of CoZrTa or like materials for magnetic poles (16, 30) in high density recording heads has created problems concerning accurate deposition and processing to create magnetic pole (30) and coil center tap (32). More specifically, the use of CoZrTa or like materials adversely affects the continuity of inductive coil lead (22b) to coil center tap (32).

In that regard, as previously discussed, the original method of contacting coil lead (22b) to coil center tap (32) was to wet chemically etch a bridge at the same time the top pole was also being etched. However, when using CoZrTa or like materials, the topography causes thinning of the RF sputtered CoZrTa in the coil and pole via regions, which have steep slopes, resulting in enhanced etchant attack and continuity problems in both regions. Moreover, because of the close proximity of the coil and pole vias, this problem was accentuated due to the inability to place those vias further apart.

Still further, as the number of processing steps and the resulting topography increases to the center tap etch step, photo processing becomes more difficult and critical, particularly photoresist exposure, development and baking (flowing) during fabrication of planars (26, 28). As a result, the dimensional control of pole tips is compromised at the center tap etch step.

Finally, the top pole RF sputtered CoZrTa material properties are different depending on the underlying material. This results in different wet chemically etched structural profiles. The top pole of a thin film inductive write head wet etched from a continuous CoZrTa film deposited over $Al_2O_3$ etches in an expected manner, while such a CoZrTa film deposited over hardbaked photoresist planar layers etches much more quickly and with much shallower wall angles, particularly over the steep slopes of underlying planar layers where the CoZrTa is thinner, as well as with greater undercut.

Referring now to FIG. 2, a cross-sectional view of one embodiment of the thin film write head of the present invention manufactured according to one embodiment of the method of the present invention is shown. In that regard, like reference numerals have been used for those portions of write head (10) similar to those of FIG. 1.

As seen in FIG. 2, to solve the problems described above, write head (10) has coil center tap (32) formed during the same wet etch step during which "bottom" magnetic pole (16) is formed. Planar (20) is then deposited on magnetic pole (16) and coil center tap (32), and processed to create vias to coil center tap (32) and magnetic pole (16). A conductive material such as copper is then electroplated on planar (20) to create coils (22a, 22b). In that regard, coil lead (22b) is fabricated directly on coil center tap (32) such that electric current may be supplied from coil center tap (32) to or from coils (22a) during operation of write head (10).

Coil center tap (32) is thus completely fabricated two major process steps earlier than in the prior art and completely encapsulated and protected during the rest of the processing steps. Moreover, the problems associated with planars (22, 24), including etching of CoZrTa on the steep slopes of planars (22, 24), are eliminated as a result. The pole via area can also be expanded, thereby eliminating the enhanced etchant attack problem. Still further, pole tip photo processing can be optimized for dimensional control.

Finally, rather than being deposited after "bottom" magnetic pole (16), magnetic gap (18) is deposited before deposition of "top" magnetic pole (30). In this fashion, a continuous layer of $Al_2O_3$ is placed under the CoZrTa of "top" magnetic pole (30). The $Al_2O_3$ "stabilizes" the CoZrTa and allows it to be etched in a uniform, expected manner. Other layers of write head (10) of FIG. 2 are similar in location to those of write head (10) of FIG. 1.

It should be noted that, while FIG. 2 depicts both the new location of coil center tap (32) and the use of magnetic gap material (18) under magnetic pole (30), such features may be also be employed separately in write head (10). Moreover, as in the prior art, the individual photolithographic steps in the fabrication of write head (10) of the present invention are well known in the art. However, by changing the order of those steps so that write head (10) of the present invention has the structure shown, the recording element and method for manufacturing that element of the present invention solve the problems of the prior art described above.

As is readily apparent from the foregoing description, then, the present invention provides an improved thin film recording element for use in high density recoding heads, and a method for manufacturing such an element. More specifically, the thin film recording element of the present invention provides a structure having an inductive coil tap fabricated from the same material layer as a magnetic pole, prior to fabrication of the inductive coil. The structure of the recording element also allows for thin film manufacture thereof according to the method of the present invention.

It should be noted, however, that the present invention is not limited to write elements or to use in tape storage systems. In that regard, the thin film recording element and method for manufacturing such an element of the present invention are also suitable for use in read elements and disk storage systems where CoZrTa or like materials are used as magnetic pole materials.

It is to be understood, then, that the present invention has been described in a illustrative manner and that the terminology which has been used is intended to be in the nature of words of description rather than of limitation. As previously stated, many modification and variations of the present invention are possible in light of the above teachings. Therefore, it is also to be understood that, within the scope of the following claims, the present invention may be practiced otherwise than as specifically described.

What is claimed is:

1. A recording element for use in a high density thin film recording head, the recording element comprising:

a substrate;

an insulative layer deposited on the substrate;

a first magnetic pole in contact with the insulative layer, the first magnetic pole fabricated from a layer of magnetic material deposited on the insulative layer;

a coil tap in contact with the insulative layer and positioned apart from the first magnetic pole, the coil tap fabricated from the magnetic material deposited on the insulative layer; and a coil having a lead deposited on the coil tap such that the coil tap is capable of conducting an electric current to the coil.

2. The recording element of claim 1 wherein the first magnetic pole and the coil tap comprise a cobalt-zirconium-tantalum alloy.

3. The recording element of claim 1 further comprising:

a planar deposited on the coil such that the coil is encapsulated;

a magnetic gap material deposited on the planar; and a second magnetic pole in contact with the magnetic gap material and the first magnetic pole.

4. The recording element of claim 3 wherein the second magnetic pole comprises a cobalt-zirconium-tantalum alloy.

5. A recording element for use in a high density thin film recording head, the recording element comprising:

a substrate;

an insulative layer deposited on the substrate;

a first magnetic pole in contact with the insulative layer, the first magnetic pole comprising a cobalt-zirconium-tantalum alloy;

a coil tap in contact with the insulative layer and positioned apart from the first magnetic pole, the coil tap comprising a cobalt-zirconium-tantalum alloy;

a first planar deposited on the first magnetic pole;

a coil deposited on the first planar, the coil having a lead deposited on the coil tap such that the coil tap is capable of conducting an electric current to the coil;

a second planar deposited on the coil;

a magnetic gap material deposited on the second planar; and a second magnetic pole deposited on the magnetic gap material and the first magnetic pole, the second magnetic pole comprising a cobalt-zirconium-tantalum alloy.

6. A method for manufacturing a recording element for use in a high density thin film recording head, the method comprising:

depositing an insulative layer on a substrate;

depositing a layer of magnetic and electrically conductive material on the insulative layer;

forming a first magnetic pole from the magnetic and electrically conductive layer deposited on the insulative layer, the first magnetic pole in contact with the insulative layer;

forming a coil tap from the magnetic and electrically conductive layer deposited on the insulative layer, the coil tap in contact with the insulative layer and positioned apart from the first magnetic pole; and depositing a coil having a lead on the coil tap such that the coil tap is capable of conducting an electric current to the coil.

7. The method of claim 6 wherein the first magnetic pole and the coil tap comprise a cobalt-zirconium-tantalum alloy.

8. The method of claim 6 further comprising:

depositing a planar on the coil such that the coil is encapsulated;

depositing a magnetic gap material on the planar; and depositing a second magnetic pole on the magnetic gap material and the first magnetic pole.

9. The method of claim 8 wherein the second magnetic pole comprises a cobalt-zirconium-tantalum alloy.

10. A recording element for use in a high density thin film recording head manufactured according to the method of claim 6.

11. A method for manufacturing a recording element for use in a high density thin film recording head, the method comprising:

depositing an insulative layer on a substrate;

depositing a layer of cobalt-zirconium-tantalum alloy on the insulative layer;

forming a first magnetic pole from the cobalt-zirconium-tantalum alloy deposited on the insulative layer, the first magnetic pole in contact with the insulative layer;

forming a coil tap from the cobalt-zirconium-tantalum alloy deposited on the insulative layer, the coil tap in contact with the insulative layer and positioned apart from the first magnetic pole;

depositing a first planar on the first magnetic pole;

depositing a coil on the first planar, the coil having a lead on the coil tap such that the coil tap is capable of conducting an electric current to the coil;

depositing a second planar on the coil;

depositing a magnetic gap material on the second planar; and depositing a second magnetic pole on the magnetic gap material and the first magnetic pole, the second magnetic pole comprising a cobalt-zirconium-tantalum alloy.

12. A recording element for use in a high density thin film recording head manufactured according to the method of claim 11.

* * * * *